United States Patent
Tsai et al.

(10) Patent No.: US 8,644,287 B2
(45) Date of Patent: Feb. 4, 2014

(54) WIRELESS COMMUNICATION SYSTEM, APPARATUS, AND METHOD FOR TRANSMITTING INFORMATION TO DESCRIBE NETWORK TOPOLOGY

(75) Inventors: Yi-Hsueh Tsai, Taipei County (TW); Chih-Chiang Hsieh, Kaohsiung County (TW); Heng-Iang Hsu, Taipei (TW); Yung-Ting Lee, Taipei (TW); Kan-Chei Loa, Taipei (TW)

(73) Assignee: Institute for Information Industry, Taipei (TW)

( * ) Notice: Subject to any disclaimer, the term of this patent is extended or adjusted under 35 U.S.C. 154(b) by 1595 days.

(21) Appl. No.: 11/778,361

(22) Filed: Jul. 16, 2007

(65) Prior Publication Data

US 2008/0039014 A1 Feb. 14, 2008

Related U.S. Application Data

(60) Provisional application No. 60/821,913, filed on Aug. 9, 2006.

(51) Int. Cl.
*H04B 7/216* (2006.01)

(52) U.S. Cl.
USPC ........... 370/342; 370/441; 370/335; 370/336; 370/320; 370/315; 455/11.1; 455/17; 455/13.1

(58) Field of Classification Search
USPC ......... 370/320, 336, 335, 315, 441; 455/11.1, 455/17, 13.1
See application file for complete search history.

(56) References Cited

U.S. PATENT DOCUMENTS

| | | | |
|---|---|---|---|
| 2005/0163156 A1* | 7/2005 | Takeda et al. | 370/468 |
| 2006/0264172 A1* | 11/2006 | Izumikawa et al. | 455/11.1 |
| 2007/0201392 A1* | 8/2007 | Ramachandran | 370/315 |
| 2007/0291679 A1* | 12/2007 | Kawakami et al. | 370/328 |
| 2008/0031182 A1* | 2/2008 | Maheshwari et al. | 370/320 |

FOREIGN PATENT DOCUMENTS

| | | | |
|---|---|---|---|
| WO | WO 2005109764 A1 * | 11/2005 | |
| WO | WO 2006/043903 A1 | 4/2006 | |
| WO | WO 2006/045499 A1 | 5/2006 | |

* cited by examiner

*Primary Examiner* — Khalid Shaheed
(74) *Attorney, Agent, or Firm* — Patterson Thuente Pedersen P.A.

(57) ABSTRACT

A wireless communication system, an apparatus, and a method for transmitting information to describe network topology of the wireless communication system in a mobile multi-hop relay standard are disclosed. The system can either be a two-hop relay station system or a multi-hop relay station system. The apparatus can use a CDMA ranging code set to transmit information and manage other apparatuses of the wireless communication system under a mobile multi-hop relay standard. The CDMA ranging code set comprises a mobile station (MS) code set and a relay station (RS) code set. The MS code set is used to transmit information from the MS to the base station (BS). Likewise, the RS code set is used to transmit information from the RS and the BS.

18 Claims, 5 Drawing Sheets

WIRELESS COMMUNICATION SYSTEM, APPARATUS, AND METHOD FOR TRANSMITTING INFORMATION TO DESCRIBE NETWORK TOPOLOGY

CROSS-REFERENCES TO RELATED APPLICATIONS

This application claims the benefit of Provisional Application Ser. No. 60/821,913 filed on Aug. 9, 2006.

BACKGROUND OF THE INVENTION

1. Field of the Invention

The present invention relates to a wireless communication system, an apparatus, and a method for transmitting information to describe network topology between multi-hop relay stations (MR-RSs). More specifically, it relates to a wireless communication system, an apparatus, and a method for transmitting information to describe network topology between the multi-hop relay stations bases on a code division multiple access (CDMA) ranging code set.

2. Descriptions of the Related Art

In the information industry, the rapid development of computer networks has led to a higher dependency on various broadband services. However, due to the costs, only a fraction of all computer users can afford high speed wired broadband services, such as digital subscribe lines (DSL) and cable broadband access. From the viewpoint of network telecommunication service providers, they would like to expand coverage range of the wired broadband network. However, the related infrastructure costs for building the wired network prevents them from doing so. Broadband wireless techniques, hence, have become important alternatives. With regards to communication distance, the current wireless network techniques can be classified into four categories: the wide area network (WAN), the metropolitan area network (MAN), the local area network (LAN), and the personal area network (PAN).

The IEEE 802.16, a worldwide interoperability for microwave access (WiMAX), is a newly developed wireless transmission standard. The original establishing objective was to set up a radio standard for the metropolitan network to provide wireless broadband connections, such as "the last mile," for the telecommunication industry. After continuous improvement, the IEEE 802.16 has been able to address more market demands, such as various mobile and high speed broadband applications. Furthermore, in comparison to other communication techniques, such as Wi-Fi and the third generation mobile communication (3G) technique, the IEEE 802.16 has a larger network bandwidth, lower construction cost, better service quality, better expansibility, and an extended usage mode at Wi-Fi hot spots.

Although the IEEE 802.16 standard already provides greater bandwidths, lower building cost, better service quality and expansibility, there are still limits to its coverage and signal quality.

For further improvement, the IEEE 802.16j standard Working Group established a mobile multi-hop relay study group in July, 2005 for building a multi-hop relay standard (MR-RS). With the development of the MR-RS, it has become important to find a solution for transmitting information to describe network topology of a wireless communication system from the mobile multi-hop relay standard in an IEEE 802.16j standard between a base station (BS), relay stations (RSs), subscriber stations (SSs), and mobile stations (MSs).

SUMMARY OF THE INVENTION

One objective of this invention is to provide a method for transmitting information between a plurality of stations to describe network topology of a wireless communication system based on a mobile multi-hop relay standard. The stations comprise a BS, an RS, and an MS/SS. The method comprises the following steps: assigning an MS code set in a CDMA ranging code set; assigning an RS code set in the CDMA ranging code set; transmitting information of the RS through the RS code set of the CDMA ranging code set from the first RS to the BS; and transmitting information of the MS through the MS code set of the CDMA ranging code set from the MS to the BS.

Another objective of this invention is to provide a method for a BS to receive information from a plurality of stations to describe network topology of a wireless communication system based on a mobile multi-hop relay standard. The method comprises the steps of assigning an MS code set in a CDMA ranging code set; assigning an RS code set in the CDMA ranging code set; and receiving information of a first RS through the RS code set of the CDMA ranging code set from the first RS.

Another objective of this invention is to provide a method for an RS to transmit information to describe network topology of a wireless communication system based on a mobile multi-hop relay standard. The method comprises the steps of: assigning an RS code set in the CDMA ranging code set; and transmitting information of the RS through the RS code set of the CDMA ranging code set.

A further objective of this invention is to provide a computer readable medium for storing a computer program. The computer program makes an apparatus execute a method for transmitting information between a plurality of stations to describe network topology of a wireless communication system based on a mobile multi-hop relay standard. The stations comprise a BS, an RS, and an MS. The method comprises the following steps: assigning an MS code set in a CDMA ranging code set; assigning an RS code set in the CDMA ranging code set; transmitting information of the RS through the RS code set of the CDMA ranging code set from the first RS to the BS; and transmitting information of the MS through the MS code set of the CDMA ranging code set from the MS to the BS.

Yet a further objective of this invention is to provide a wireless communication system having a plurality of stations based on a mobile multi-hop relay standard. The wireless communication system comprises an RS, an MS, and a BS. The BS uses a CDMA ranging code set with an MS code set and an RS code set to manage information transmission of the RS and the MS. The RS transmits information of the RS to the BS through the RS code set of the CDMA ranging code set, and the MS transmits information of the MS to the BS through the MS code set of the CDMA ranging code set to describe network topology of the wireless communication system.

Another objective of this invention is to provide a communication apparatus that can use the CDMA ranging code set for transmitting information under a mobile multi-hop relay standard. The apparatus would then assign the CDMA ranging code set to an MS code set and an RS code set.

By satisfying these objectives, the present invention enables information transmission for describing network topology of a wireless communication system in a mobile multi-hop relay standard. Accordingly, the coverage and signal quality of a mobile multi-hop relay standard can be improved using the above frame structure, and the information transmission between the stations, such as the BS, the RSs, and the MSs, can also be accomplished successfully.

The detailed technology and preferred embodiments implemented for the subject invention are described in the following paragraphs accompanying the appended drawings for people skilled in the art to well appreciate the features of the claimed invention.

DESCRIPTION OF THE PREFERRED EMBODIMENT

The IEEE 802.16j standard is a standard that is based on the IEEE 802.16 standard and that further comprises a two-hop relay station system of the present invention.

Figure 1:
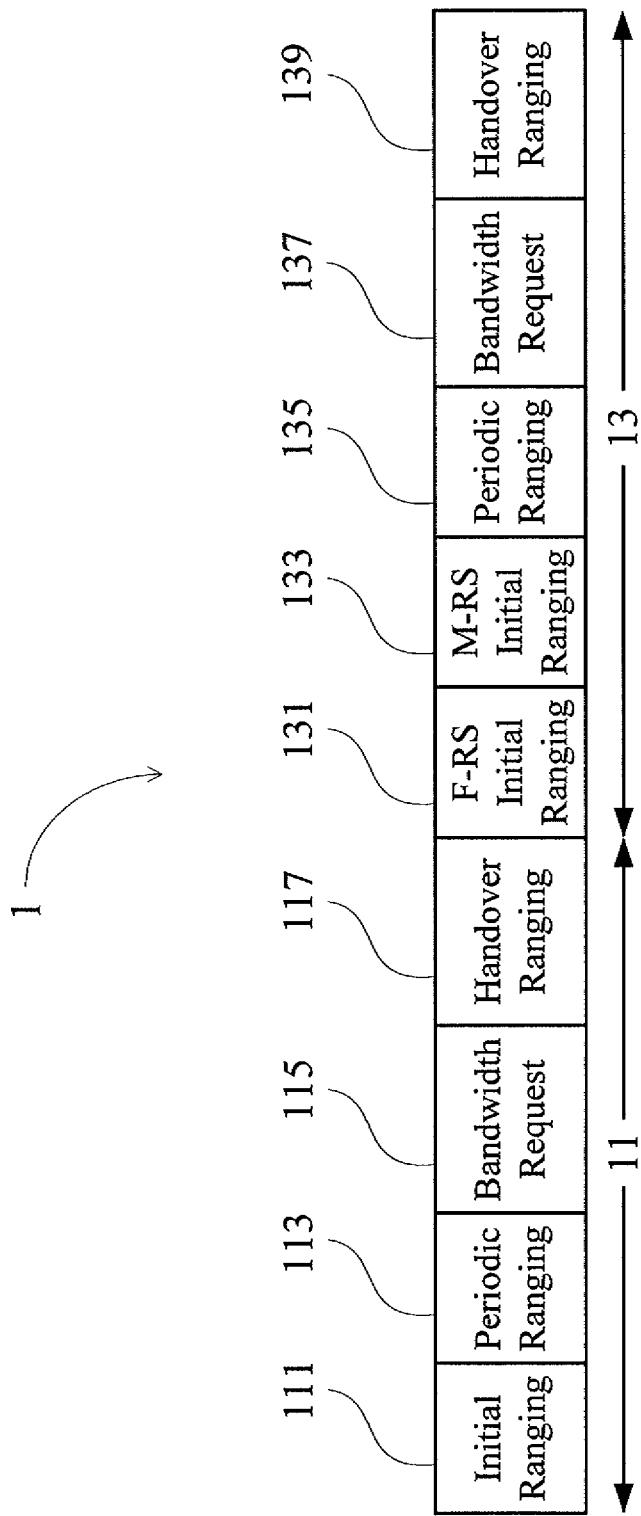
FIG. 1 is a schematic diagram illustrating a CDMA ranging code set for a wireless communication system of a first embodiment of the present invention.

A first embodiment of the present invention is a CDMA ranging code set which enables a wireless communication system to transmit information to describe network topology of the wireless communication system under the IEEE 802.16j standard, wherein the wireless communication system is a two-hop relay station system based on the MMR-RS. The CDMA ranging code set 1 is illustrated in FIG. 1. The CDMA ranging code set 1 is assigned to an MS code set 11 and an RS code set 13. The MS code set 11 comprises an initial ranging section 111, a period ranging section 113, a bandwidth request section 115, and a handover ranging section 117, all of which are established to transmit information from the MS to the BS. The RS code set 13 comprises a fixed-RS (F-RS) initial ranging section 131, a mobile-RS (M-RS) initial ranging section 133, a periodic ranging section 135, a bandwidth request section 137, and a handover ranging section 139, all of which are established to transmit information from the RS to the BS. Based on the standard, it is unnecessary to arrange the F-RS initial ranging section 131, the M-RS initial ranging section 133, the periodic ranging section 135, the bandwidth request section 137, and the handover ranging section 139 in the RS code set 13 of each CDMA ranging code 1. For example, if the RS is mobile, the F-RS initial ranging section 131 does not need to be arranged. Likewise, if the RS is fixed, the M-RS initial ranging section 131 does not need to be arranged either.

Figure 2:
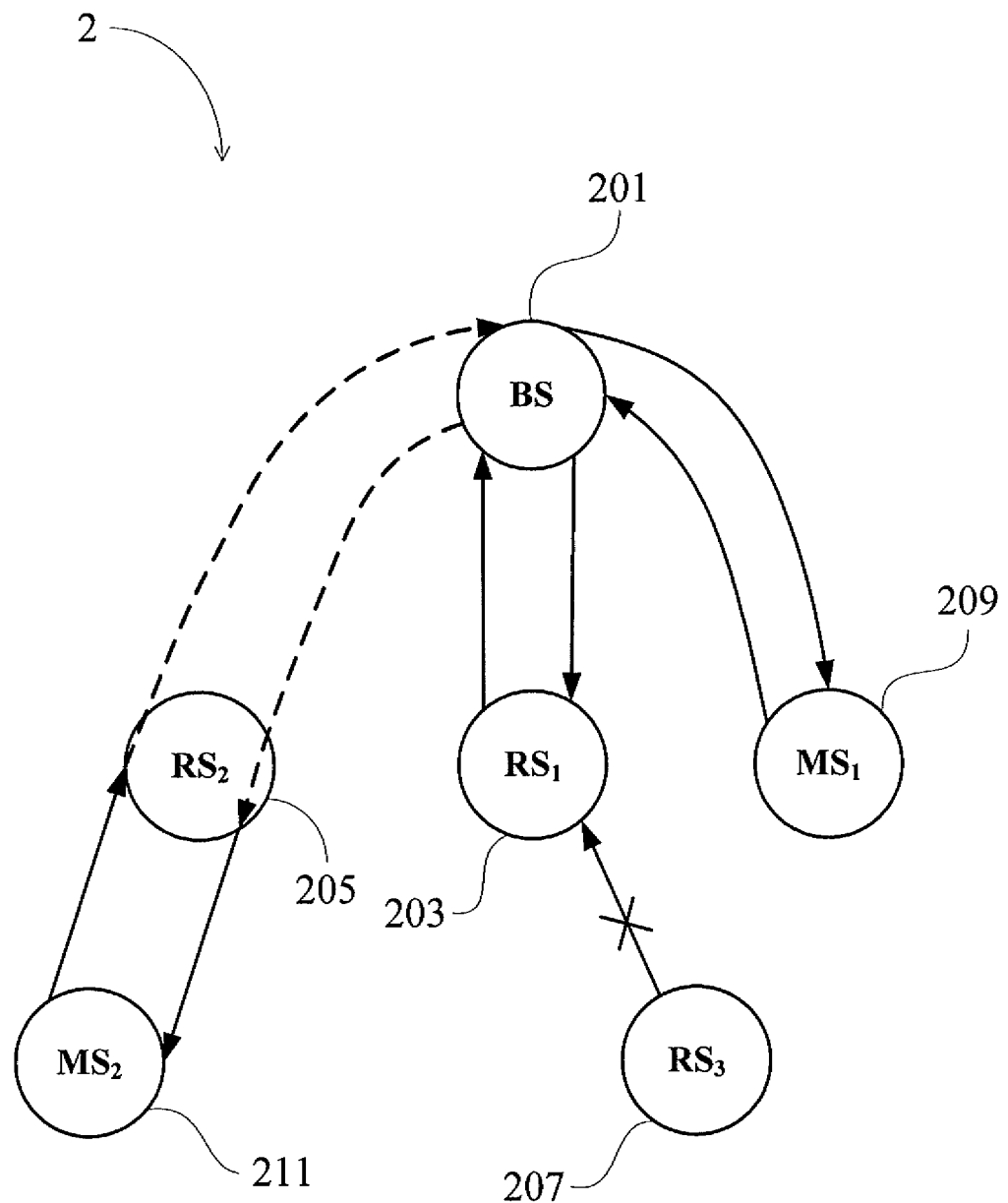
FIG. 2 is a schematic diagram illustrating a two-hop relay station system of the MMR-RS based on a mobile multi-hop relay standard of a second embodiment of the present invention.

A second embodiment of the present invention is a two-hop relay station system 2 based on the MMR-RS under the IEEE 802.16j standard as illustrated in FIG. 2. The two-hop relay station system 2 comprises a BS 201, a plurality of RSs, such as $RS_1$ 203, $RS_2$ 205, and $RS_3$ 207, and a plurality of MSs, such as $MS_1$ 209 and $MS_2$ 211. The BS 201 can manage devices of the two-hop relay station system and transmit data and/or information with these devices, such as the $RS_1$ 203, $RS_2$ 205, $MS_1$ 209, etc., by using the CDMA ranging code set 1 as illustrated in FIG. 1. The CDMA ranging code set 1 is assigned to an MS code set 11 and an RS code set 13 by the BS 201. The following description illustrates an example. The $MS_1$ 209 can be registered into the BS 201 through the initial ranging 111 of the MS code set 11 directly. The $RS_1$ 203, which can be the F-RS or the M-RS, can be registered into the BS 201 through the F-RS initial ranging 131 or the M-RS initial ranging 133 of the RS code set 13 directly. The $MS_2$ 211 can be registered into the BS 201 through the initial ranging 111 of the MS code set 11. However, the BS 201 of the two-hop relay station system 2 does not allow an RS to register via another RS because the wireless communication system is a two-hop relay station system. It means that the BS 201 can predetermine a connection number of the stations in the wireless communication system, such as a maximum series connection number of RSs. And the $RS_3$ 207 transmits information of the $RS_3$ 207 to the $RS_1$ 203 through the RS code set 13 of the CDMA ranging code set 1 and the $RS_1$ 203 determines whether to connect the $RS_3$ 207 to the wireless communication system via the $RS_1$ 203 according to the connection number of the stations predetermined by the BS 201. In the second embodiment, the $RS_3$ 207 does not register the BS 201 via the $RS_1$ 203 because the maximum series connection number of RSs is reached. That is, the $RS_1$ 203 can not allow the $RS_3$ 207 to be connected to the two-hop relay station system 2.

A third embodiment of the invention provides a method for transmitting information between a plurality of stations to describe network topology of a wireless communication system based on the IEEE 802.16j standard. The method applied to a communication apparatus, such as the BS 201, is as described in the second embodiment. More specifically, the method of the third embodiment is applied using a computer program to control information transmission in the two-hop relay station system 2. The corresponding flow chart is shown in FIG. 3.

First, step 301 is executed for assigning an MS code set in a CDMA ranging code set. Next, step 303 is executed for assigning an RS code set in a CDMA ranging code set. Step 305 is executed for predetermining a connection number of the stations in the wireless communication system. Then, step 307 is executed for transmitting information using the RS code set of the CDMA ranging code set from a first RS to a BS. Step 309 is executed for transmitting information through the MS code set of the CDMA ranging code set from an MS to the BS. Step 311 is executed for transmitting information using the RS code set of the CDMA ranging code set from a second RS to the first RS. Finally, step 313 is executed for determining whether to connect the second RS to the wireless communication system via the first RS according to the connection number of the stations.

Figure 3:
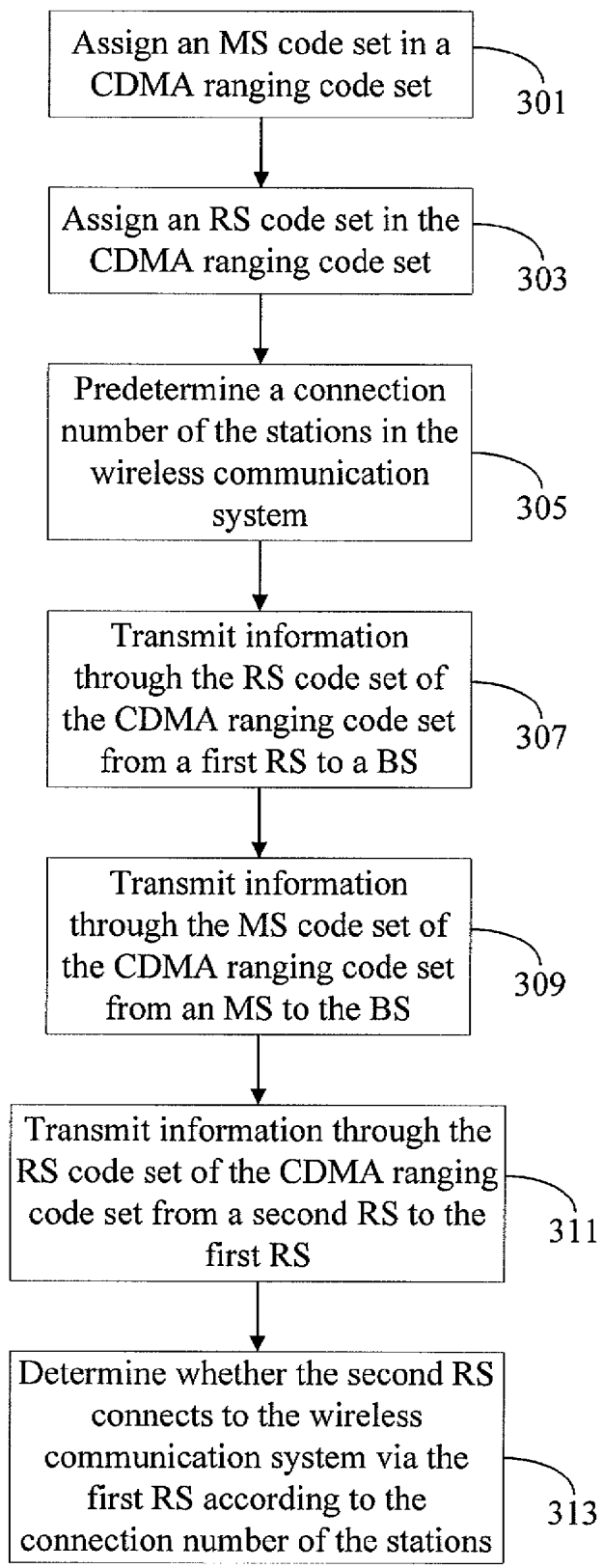
FIG. 3 is a flow chart of a third embodiment of the present invention.

In addition to the steps shown in FIG. 3, the third embodiment can also execute all the operations of the second embodiment. Those skilled in the art can understand the corresponding steps and operations of the third embodiment by looking at those in the second embodiment; thus, no unnecessary detail is given.

The above methods can be implemented by using a computer readable medium, which store a computer program to execute the aforesaid steps. The computer readable medium can be a floppy disk, a hard disk, an optical disc, a flash disk, a tape, a network accessible database or a storage medium with the same functionality.

Figure 4:
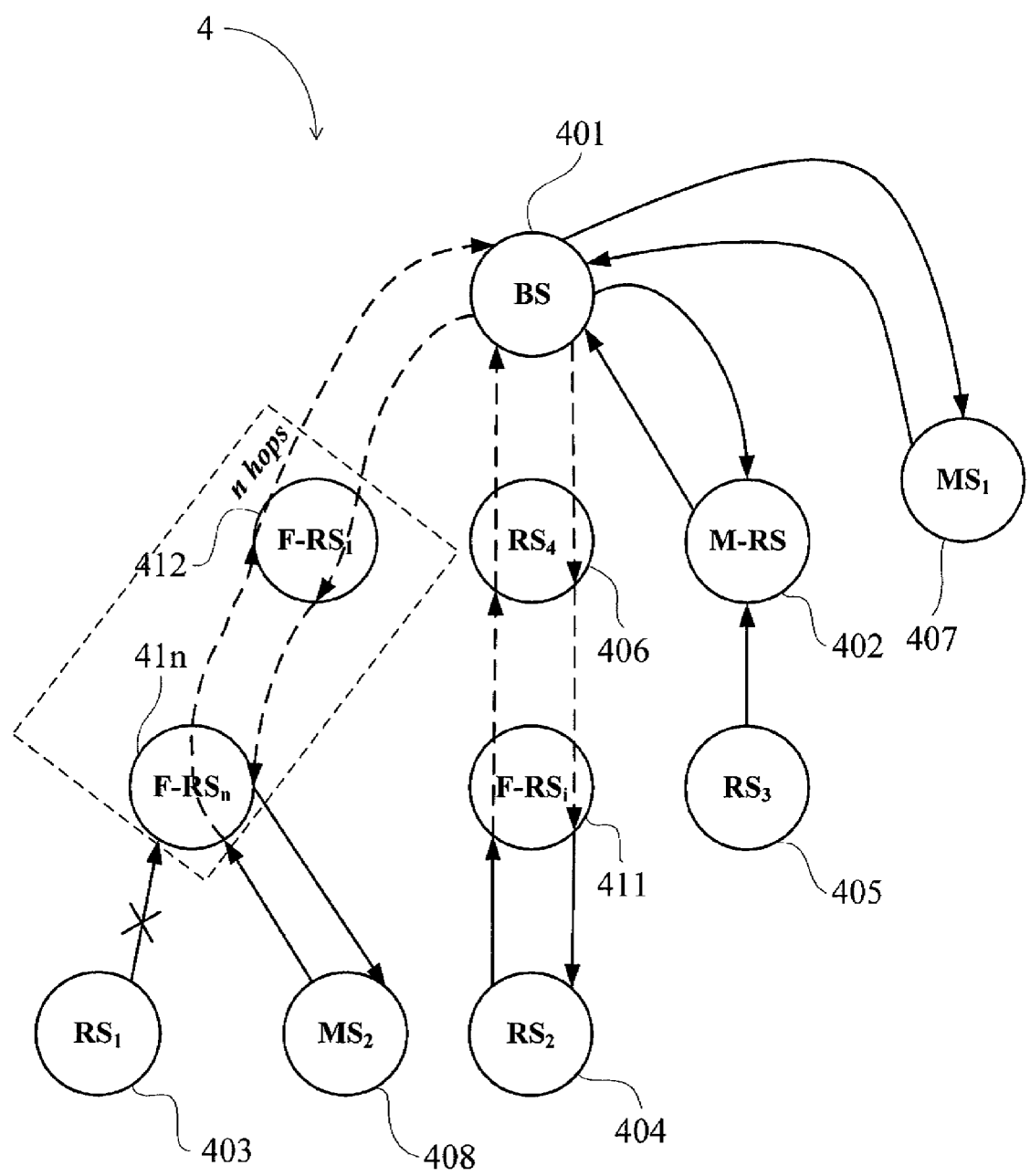
FIG. 4 is a schematic diagram illustrating a multi-hop relay station system of the MMR-RS based on a mobile multi-hop relay standard of a fourth embodiment of the present invention.

A fourth embodiment of the present invention is a multi-hop relay station system 4 of the MMR-RS based on the IEEE 802.16j standard as illustrated in FIG. 4. The multi-hop relay station system 4 comprises a BS 401, an M-RS 402, a plurality of RSs, such as $RS_1$ 403, $RS_2$ 404, $RS_3$ 405, and $RS_4$ 406, a plurality of F-RSs, such as $F\text{-}RS_i$ 411, $F\text{-}RS_1$ 412, $F\text{-}RS_2$, ..., and $F\text{-}RS_n$ 41n, and a plurality of MSs, such as $MS_1$ 407 and $MS_2$ 408. The BS 401 of the multi-hop relay station system 4 predetermines a maximum series connection number of RSs. For example, if the maximum series connection number of RSs is five and there are five F-RSs between $F\text{-}RS_1$ 412 and $F\text{-}RS_n$ 41n, the $RS_1$ 403 is prohibited registering in the BS 401 via the $F\text{-}RS_1$ 412, ..., and the $F\text{-}RS_n$ 41n. The BS 401 can manage devices of the multi-hop relay station system and transmit data and/or information through a CDMA ranging code set with these devices, such as the $RS_1$ 403, $RS_2$ 404, $MS_1$ 407, $MS_2$ 408, etc.

The CDMA ranging code set can be assigned to an MS code set and an RS code set by the BS 401 of the multi-hop relay station system 4 as described in the first embodiment. The MS code set comprises an initial ranging section, a period ranging section, a bandwidth request section, and a handover ranging section, all of which are established to transmit information from the MS to the BS. The RS code set comprises an F-RS initial ranging section, an M-RS initial ranging section, a periodic ranging section, a bandwidth request section, and a handover ranging section, all of which are established to transmit information from the RS and BS.

The following illustrates an example. The $MS_1$ 407 can directly register the BS 401 through the initial ranging section of the original MS code set of the CDMA ranging code set. The M-RS 402 can directly register the BS 401 by the M-RS initial ranging section 133 of its RS code set 13 as illustrated in FIG. 1. The $RS_3$ 405, which may be either the F-RS or the M-RS, can register the BS 401 via the M-RS 402 through the F-RS initial ranging section 131 or the M-RS initial ranging section 133 of its RS code set 13 as illustrated in FIG. 1. The $RS_4$ 406, which may be either the F-RS or the M-RS, can directly register the BS 401 through the F-RS initial ranging section 131 or the M-RS initial ranging section 133 of its RS code set 13 as illustrated in FIG. 1. The $F\text{-}RS_i$ 411 can register the BS 401 via the $RS_4$ 406 through the F-RS initial ranging section 131 of its RS code set 13 as illustrated in FIG. 1. The $RS_2$ 404, which may be either the F-RS or the M-RS, can register the BS 401 via the series connection of the $F\text{-}RS_i$ 411 and the $RS_4$ 406 through the F-RS initial ranging section 131 or the M-RS initial ranging section 133 of its RS code set 13 as illustrated in FIG. 1. The $F\text{-}RS_1$ 412 can directly register the BS 401 through the F-RS initial ranging section of its RS code set. When the maximum series connection number of RSs is reached, no other RS is allowed to register in the BS 401 anymore. For example, the $RS_1$ 403 transmits information of the $F\text{-}RS_n$ 41n to the $RS_1$ 403 through the RS code set 13 of the CDMA ranging code set 1, and the $F\text{-}RS_n$ 41n determines whether to connect the $RS_1$ 403 to the wireless communication system via the $F\text{-}RS_1$ 412~$F\text{-}RS_n$ 41n according to the connection number of the stations predetermined by the BS 401. In the forth embodiment, the $RS_1$ 403 does not register the BS 401 via the $F\text{-}RS_1$ 412~$F\text{-}RS_n$ 41n because the maximum series connection number of RSs is reached. It means that it can not allow the $RS_1$ 403 to be connected to the multi-hop relay station system 4.

Figure 5:
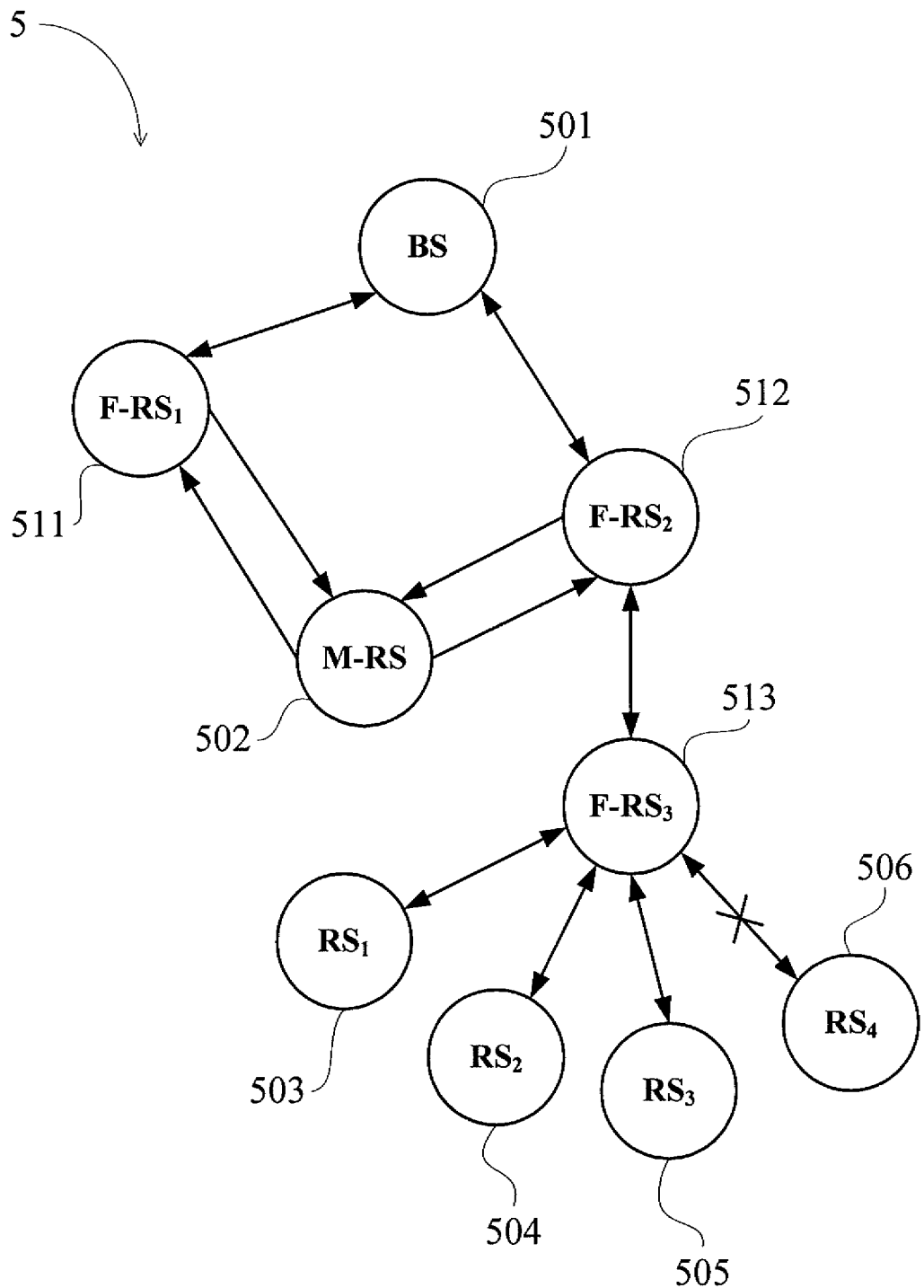
FIG. 5 is another schematic diagram illustrating a multi-hop relay station system based on the MMR-RS under a mobile multi-hop relay standard of a fifth embodiment of the present invention.

A fifth embodiment of the present invention is another multi-hop relay station system 5 of the MMR-RS under the IEEE 802.16j standard as illustrated in FIG. 5. The multi-hop relay station system 5 comprises a BS 501, an M-RS 502, a plurality of RSs, such as $RS_1$ 503, $RS_2$ 504, $RS_3$ 505, and $RS_4$ 506, a plurality of F-RSs, such as $F\text{-}RS_1$ 511, $F\text{-}RS_2$ 512, and $F\text{-}RS_3$ 513. The BS 501 can manage devices of the multi-hop relay station system 5 through the CDMA ranging code set as illustrated in FIG. 1 or other kinds of CDMA ranging code sets. According to the fifth embodiment, the number of RSs that the $F\text{-}RS_3$ 513 can serve is predetermined by the BS 501 or the $F\text{-}RS_3$ 513.

In the aforementioned descriptions, if the $F\text{-}RS_3$ 513 can just serve three RSs, any F-RS or M-RS other than the $RS_1$ 503, $RS_2$ 504, $RS_3$ 505, such as the $RS_4$ 506, can not register in the BS 501 via the $F\text{-}RS_3$ 513 through the F-RS initial ranging of its RS code set because the $F\text{-}RS_3$ 513 will block the $RS_4$ 506 according to the number of RSs that the $F\text{-}RS_3$ 513 can serve. If the M-RS 502 registers in the BS 501 via the $F\text{-}RS_1$ 511 through the M-RS initial ranging section of its original RS code first, the M-RS 502 is allowed to register the BS 501 via the $F\text{-}RS_2$ 512 through the handover ranging section of its RS code set after the M-RS 502 moves from the $F\text{-}RS_1$ 511 to the $F\text{-}RS_2$ 512 for connection.

A sixth embodiment of the invention is to provide a method for transmitting information between a plurality of stations to describe network topology of a wireless communication system based on the IEEE 802.16j standard. The method is applied to the BS 401 or the BS 501 as described in the fourth and the fifth embodiments. Specifically, the method of the sixth embodiment is applied using a computer program to control information transmission of the multi-hop relay station system 4 and 5. The corresponding flow chart is also shown in FIG. 3.

In addition to the steps revealed in FIG. 3, the sixth embodiment can also execute all the operations of the fourth and the fifth embodiments. Those skilled in the art can understand the corresponding steps and operations of the sixth embodiment by reading the explanations of the fourth and the fifth embodiments; thus, no unnecessary detail is given.

The above methods can be implemented using a computer readable medium that can store a computer program for executing the aforesaid steps. The computer readable medium can be a floppy disk, a hard disk, an optical disc, a flash disk, a tape, a network accessible database or a storage medium with the same functionality.

According to the aforementioned descriptions, this invention provides a new method of data transmission which can be used for an IEEE 802.16j standard to describe network topology of a wireless communication system. As a result, the coverage and signal quality of the IEEE 802.16j standard can be expanded and improved using this new method of information transmission.

The above disclosure is related to the detailed technical contents and inventive features thereof. People skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A method for transmitting information between a plurality of stations to describe network topology of a wireless communication system based on a mobile multi-hop relay standard, the stations comprising a base station (BS), a first relay station (RS), and a mobile station (MS), the method comprising the steps of:
assigning an MS code set in a code division multiple access (CDMA) ranging code set by the BS;

assigning RS code set in the CDMA ranging code set by the BS, the RS code set comprising a fixed-RS (F-RS) initial ranging an section, a mobile-RS (M-RS) initial ranging section, a periodic ranging section, a bandwidth request section, and a handover ranging section;

transmitting information of the first RS through the RS code set of the CDMA ranging code set from the first RS to the BS; and transmitting information of the MS through the MS code set of the CDMA ranging code set from the MS to the BS.

2. The method of claim 1, wherein the stations further comprise a second RS, and the method further comprises the step of:

transmitting information of the second RS through the RS code set of the CDMA ranging code set from the second RS to the BS.

3. The method of claim 1, further comprising the step of: predetermining a connection number of the stations in the wireless communication system.

4. The method of claim 3, wherein the stations further comprise a second RS, and the method further comprises the step of:

transmitting information of the second RS through the RS code set of the CDMA ranging code set from the second RS to the first RS; and determining whether to connect the second RS to the wireless communication system via the first RS according to the connection number of the stations.

5. A method for a BS to receive information from a plurality of stations to describe network topology of a wireless communication system based on a mobile multi-hop relay standard, comprising the steps of:

the BS assigning an MS code set in a CDMA ranging code set;

the BS assigning an RS code set in the CDMA ranging code set, the RS code set comprising a fixed-RS (F-RS) initial ranging section, a mobile-RS (M-RS) initial ranging section, a periodic ranging section, a bandwidth request section, and a handover ranging section;

receiving information of a first RS through the RS code set of the CDMA ranging code set from the first RS; and receiving information of an MS through the MS code set of the CDMA ranging code set from the MS.

6. The method of claim 5, further comprising the step of:

receiving information of a second RS through the RS code set of the CDMA ranging code set from the second RS.

7. The method of claim 5, further comprising the step of: predetermining a connection number of the stations in the wireless communication system.

8. A non-transitory computer readable medium storing a computer program for executing a method for transmitting information between a plurality of stations to describe network topology of a wireless communication system based on a mobile multi-hop relay standard, the stations comprising a BS, a first RS, and an MS, the method comprising the steps of:

assigning an MS code set in a CDMA ranging code set by the BS;

assigning an RS code set in the CDMA ranging code set by the BS, the RS code set comprising a fixed-RS (F-RS) initial ranging section, a mobile-RS (M-RS) initial ranging section, a periodic ranging section, a bandwidth request section, and a handover ranging section;

transmitting information of the first RS through the RS code set of the CDMA ranging code set from the first RS to the BS; and transmitting information of the MS through the MS code set of the CDMA ranging code set from the MS to the BS.

9. The non-transitory computer readable medium of claim 8, wherein the stations further comprise a second RS, and the method further comprises the step of:

transmitting information of the second RS through the RS code set of the CDMA ranging code set from the second RS to the BS.

10. The non-transitory computer readable medium of claim 8, wherein the method further comprises the step of: predetermining a connection number of the stations in the wireless communication system.

11. The non-transitory computer readable medium of claim 10, wherein the stations further comprise a second RS, and the method further comprises the step of:

transmitting information of the second RS through the RS code set of the CDMA ranging code set from the second RS to the first RS; and determining whether to connect the second RS to the wireless communication system via the first RS according to the connection number of the stations.

12. A wireless communication system having a plurality of stations based on a mobile multi-hop relay standard, comprising:

a first RS;

an MS; and a BS for assigning an MS code set and an RS code set in a CDMA ranging code set;

wherein the first RS transmits information of the first RS to the BS through the RS code set of the CDMA ranging code set, the RS code set comprising a fixed-RS (F-RS) initial ranging section, a mobile-RS (M-RS) initial ranging section, a periodic ranging section, a bandwidth request section, and a handover ranging section, and the MS transmits information of the MS to the BS through the MS code set of the CDMA ranging code set to describe network topology of the wireless communication system.

13. The wireless communication system of claim 12, wherein the stations further comprises a second RS and the second RS transmits information of the second RS to the BS through the RS code set of the CDMA ranging code set.

14. The wireless communication system of claim 12, wherein the BS predetermines a connection number of the stations in the wireless communication system.

15. The wireless communication system of claim 14, wherein the stations further comprises a second RS, the second RS transmits information of the second RS to the first RS through the RS code set of the CDMA ranging code set, and the first RS determines whether to connect the second RS to the wireless communication system via the first RS according to the connection number of the stations.

16. The wireless communication system of claim 14, wherein the connection number is a maximum series connection number of a plurality of RSs.

17. A base station using a CDMA ranging code set for transmitting information under a mobile multi-hop relay standard, wherein the base station assigns an MS code set and an RS code set in the CDMA ranging code set for transmitting information between an MS and a BS and between an RS and the BS, and predetermines a connection number of a plurality of stations under the mobile multi-hop relay standard.

18. The wireless communication apparatus of claim 17, wherein the connection number is a maximum series connection number of a plurality of RSs.

* * * * *